(12) United States Patent
Fu et al.

(10) Patent No.: US 6,261,477 B1
(45) Date of Patent: *Jul. 17, 2001

(54) LONG-LASTING PHOSPHOR

(75) Inventors: Jie Fu, Sagamihara; Yasuo Ochi, Kunitachi; Susumu Uehara, Sagamihara, all of (JP)

(73) Assignee: Kabushiki Kaisha Ohara, Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/304,416

(22) Filed: May 3, 1999

(30) Foreign Application Priority Data

May 13, 1998 (JP) .................................. 10-148351
Oct. 8, 1998 (JP) .................................. 10-286520

(51) Int. Cl.$^7$ ......................... C09K 11/59; C09K 11/64; C09K 11/66; C09K 11/71
(52) U.S. Cl. ........................ 252/301.4 R; 252/301.4 F
(58) Field of Search ...................... 252/301.4 F, 301.4 R

(56) References Cited

U.S. PATENT DOCUMENTS 5,961,884 * 10/1999 Endo et al. .................... 252/301.4 F
6,010,644 * 1/2000 Fu et al. ......................... 252/301.4 R

FOREIGN PATENT DOCUMENTS 1053807A 8/1991 (CN) .
59-102979 * 6/1984 (JP) .

OTHER PUBLICATIONS

Chinese Journal of Luminescence, vol. 12, No. 2, p. 144 (Jun. 1991).

* cited by examiner

Primary Examiner—C. Melissa Koslow
(74) Attorney, Agent, or Firm—Hedman & Costigan, P.C.

(57) ABSTRACT

There is provided a long-lasting phosphor being activated by divalent europium and having a chemical composition $RO \cdot a(Al_{1-x}Ga_x)_2O_3 \cdot bM_mO_n \cdot cB_2O_3 \cdot dEu^{3+}$ (where R is at least one selected from the group consisting of alkaline-earth metals and Zn, and M is at least one selected from the group consisting of Y, Sc and Si) wherein a, b, c, d and x are within ranges of $0.3 \leq a \leq 8$, $0 < b \leq 0.2$, $0.001 \leq c \leq 0.3$, $0.001 \leq d \leq 0.3$, and $0 \leq x < 1.0$.

4 Claims, 4 Drawing Sheets

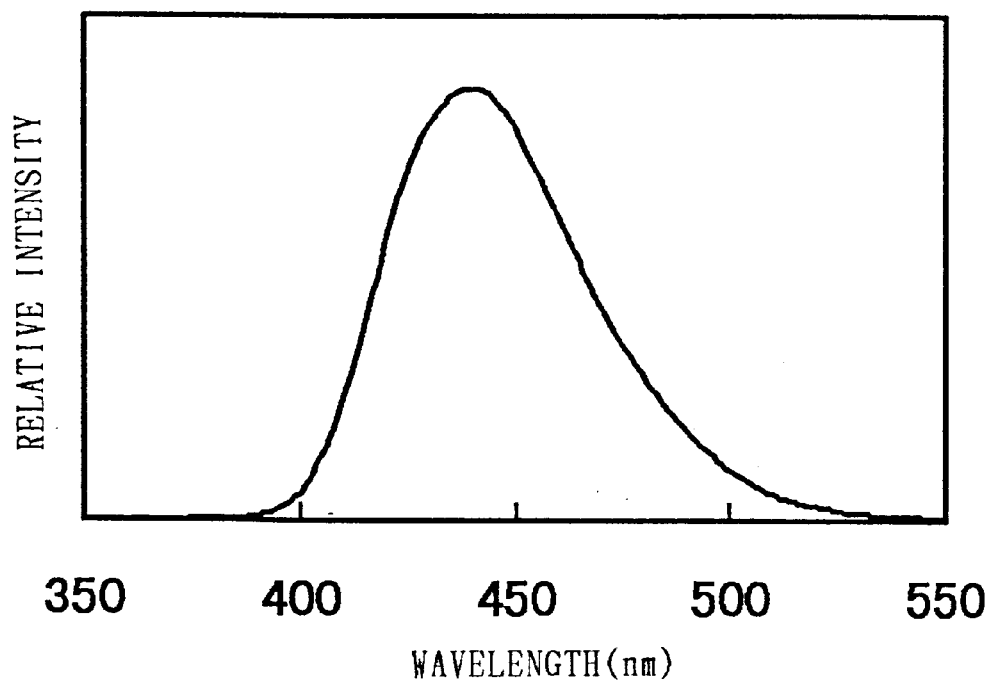
F I G. 1
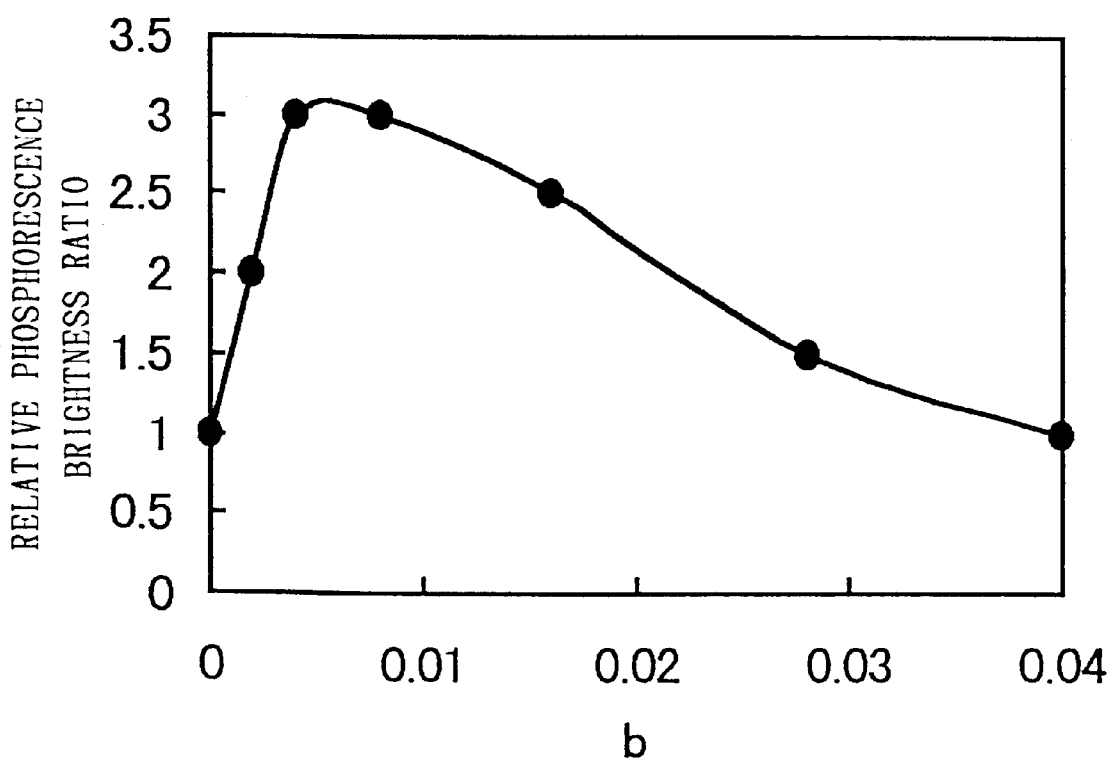
F I G. 2

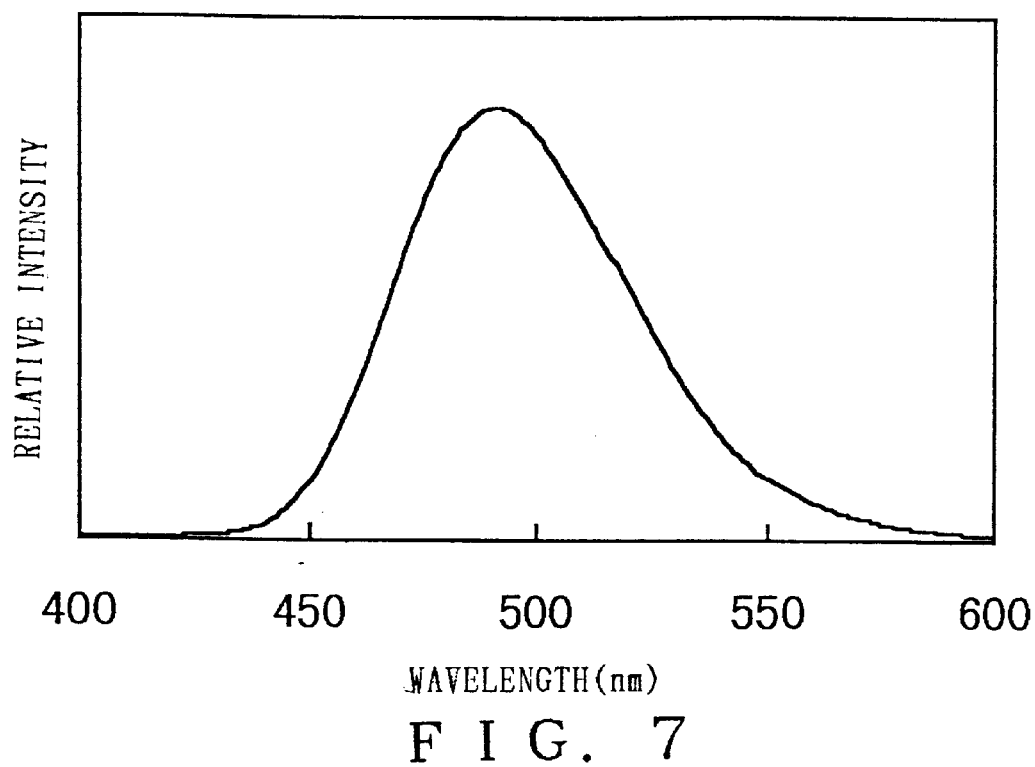
F I G. 7
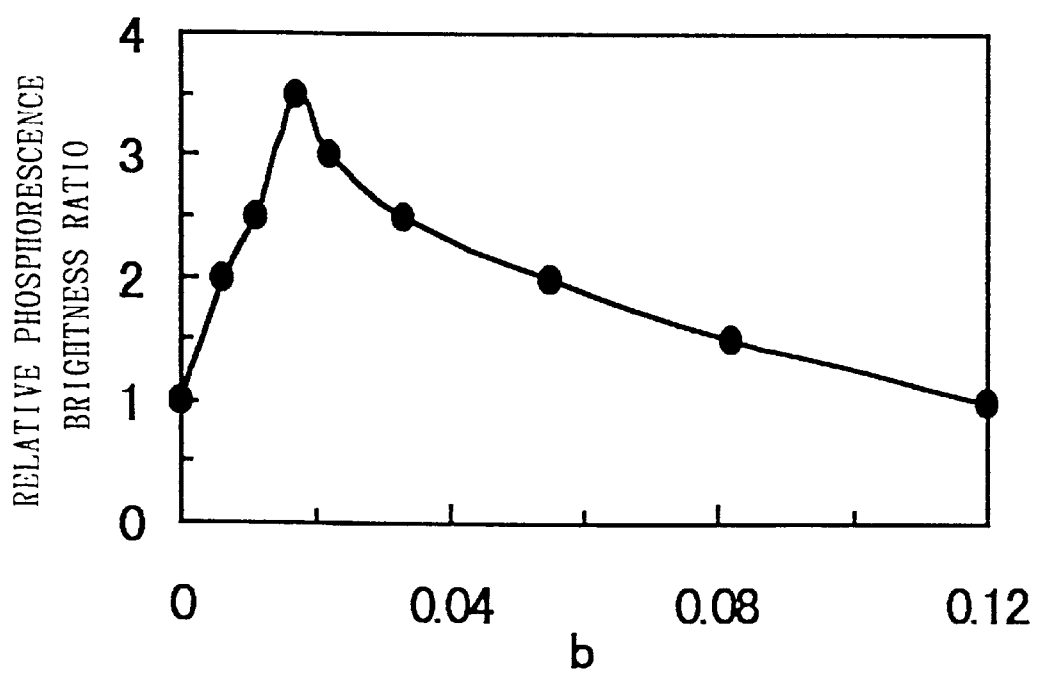
F I G. 8

LONG-LASTING PHOSPHOR

BACKGROUND OF THE INVENTION

This invention relates to a long-lasting phosphor and, more particularly, to a novel long-lasting phosphor with improved phosphorescence brightness and lifetime and with various emission wavelengths having a chemical composition $RO.a(Al_{l-x}Ga_x)_2O_3.bM_mO_n.cB_2O_3.dEu^{2+}$ (where R is at least one selected from the group consisting of alkaline-earth metals and Zn, and M is at least one selected from the group consisting of Y, Sc and Si).

Fluorescence is a phenomenon that a material emits visible ray when excited by an excitation source applied from outside. A fluorescent lamp, a discharge tube and a cathode ray tube (CRT) emit fluorescence. A material which emits fluorescence is called a phosphor. When light emitted by a phosphor lasts after stoppage of excitation for duration of time sufficient for the light to be perceived by the eye, i.e., about 0.1 second or longer, the light is called phosphorescence. A phosphor which has a long persistent phosphorescence is called a long-lasting phosphor or a light storage phosphor. As long-lasting phosphors, known in the art are sulfides and oxides. The ZnS:Cu sulfide long-lasting phosphors have been practically used for several decades but they are disadvantageous in that their after-glow lasts for a relatively short duration of time, i.e., about three hours at the longest. Further, this type of phosphor has a fatal defect in that a decomposition reaction of $ZnS+H_2O \rightarrow Zn+H_2S$ takes place under the coexistence of ultraviolet ray contained in the sunlight and moisture contained in the air, causing the phosphor to become black in color and, as a result, the after-glow characteristics significantly deteriorate within a relatively short period of time. For this reason, this type of phosphor has only limited applications such as a luminous watch and a night-time display of a location in a house.

On the other hand, reports have been made about oxide type long-lasting phosphors of $m(Sr_{1-x}Eu_x)O.nAl_2O_3.yB_2O_3$ (Chinese Patent CN1053807A) and $4(Sr, Eu)O.7Al_2O_3$ (Chinese journal of luminescence, 12 (1991) 144.). Phosphorescence brightness and lifetime of these phosphors are still insufficient for using them for practical applications.

Since, however, these oxides have an excellent chemical durability and light resistance property, if the phosphorescent properties can be improved largely, they will be expected to have wide applications such as signs for preventing disasters, signs for indicating locations for keeping away from danger and decorations in addition to the existing applications for luminous watches and night time display in a house etc.

It is, therefore, an object of the invention to provide a novel $Eu^{2+}$-activated alkaline-earth metal aluminate long-lasting phosphor having improved phosphorescence brightness and lifetime.

SUMMARY OF THE INVENTION

For achieving the above described object of the invention, the inventors of the present invention have conducted studies and experiments about the existing $Eu^{2+}$-activated alkaline-earth metal aluminate long-lasting phosphors and found, which has led to the present invention, that, by introducing at least one of yttrium oxide, scandium oxide and silicon oxide into these long-lasting phosphors, phosphorescence brightness and lifetime can be both improved.

According to the invention, there is provided a long-lasting phosphor being activated by divalent europium and having a chemical composition $RO.a(Al_{1-x}Ga_x)_2O_3.bM_mO_n.cB_2O_3.dEu^{2+}$ (where R is at least one selected from the group consisting of alkaline-earth metals and Zn, and M is at least one selected from the group consisting of Y, Sc and Si) wherein a, b, c, d and x are within ranges of $0.3 \leq a \leq 8$,
$0 < b \leq 0.2$,
$0.001 \leq c \leq 0.3$,
$0.001 \leq d \leq 0.3$, and
$0 \leq x < 1.0$.

If M is Y or Sc, m is 2 and n is 3; if M is Si, m is 1 and n is 2.

In the long-lasting phosphor of the present invention, $Al_2O_3$ is an essential ingredient for constituting a host crystal. The long-lasting phosphor has phosphorescence brightness and lifetime in case the coefficient a which represents the composition ratio of $Al_2O_3$ is within the range of $0.3 \leq a \leq 8$ and no significant phosphorescence brightness and lifetime can be observed outside of this range.

$Y_2O_3$, $Sc_2O_3$ and $SiO_2$ are indispensable ingredients for improving phosphorescence brightness and lifetime because they function to enhance or stabilize growth of a carrier trap which contributes to phosphorescence. The most effective improvements in phosphorescence brightness and lifetime have been observed in case the coefficient b which represents the composition ratio of one or more of these ingredients is within the range of $0 < b \leq 0.2$.

The coefficient c represents the composition ratio of $B_2O_3$. In case the coefficient c is within the range of $0.001 \leq c \leq 0.3$, it is effective for increasing phosphorescence brightness.

The coefficient d which represents the concentration of the activator $Eu^{2+}$ should be within the range of $0.001 \leq d \leq 0.3$. If d is below 0.001, absorption of light is deteriorated with the result that no phosphorescence brightness which can be observed by the naked eye can be obtained. If d exceeds 0.3, phosphorescence brightness decreases due to concentration quenching.

The coefficient x represents the ratio of substitution of Al by Ga. It is possible to substitute nearly all of Al by Ga but, to obtain a more excellent property, the substitution should be made preferably within the range of x<0.5 and, more preferably, within the range of x<0.2.

DETAILED DESCRIPTION OF THE INVENTION

The long-lasting phosphors of the invention can be produced by sintering. The starting materials of the long-lasting phosphors of the present invention includes the following materials:

(1) alkaline-earth metal oxide (RO) or a compound such as alkaline-earth metal carbonate, nitrate or halide which can be converted easily to $R^{2+}$ at a high temperature (2) aluminum oxide ($Al_2O_3$) or a compound such as aluminum nitrate, hydroxide or halide which can be converted easily to $Al^{3+}$ at a high temperature (3) yttrium oxide ($Y_2O_3$) or a compound such as yttrium nitrate or halide which can be converted easily to $Y^{3+}$ at a high temperature (4) scandium oxide ($Sc_2O_3$) or a compound such as scandium nitrate or halide which can be converted easily to $Sc^{3+}$ at a high temperature (5) silicon oxide ($SiO_2$) or a compound such as silicon nitrate or halide which can be converted easily to $Si^{4+}$ at a high temperature (6) europium oxide ($Eu_2O_3$) or a compound such as europium carbonate, nitrate or halide which can be converted easily to $Eu^{2+}$ at a high temperature These materials are weighed at a predetermined ratio and mixed sufficiently. The mixed materials are put in an aluminum crucible and sintered in a reducing atmosphere under the temperature within a range from 1100° C. to 1600° C. for about one hour to ten hours. In some cases, depending upon the composition of the phosphor, a sintered material may be crushed and subjected to sintering again under the same sintering conditions.

In synthesizing the long-lasting phosphor of the present invention, a phosphorous compound such as $NH_4H_2PO_4$ or a halide such as $NH_4F$, $NH_4Cl$ or $NH_4Br$ may be added as a flux. An optimum amount of addition of such flux is within a range from 0.02 mol % to 8 mol %.

BRIEF DESCRIPTION OF THE DRAWINGS

In the accompanying drawings,

FIG. 1 is a graph showing the emission spectrum of Example 1;

FIG. 2 is a graph showing relative phosphorescence brightness ratio of a blue long-lasting phosphor $CaO.Al_2O_3.bY_2O_3.0.02B_2O_3.0.004Eu_2O_3$ as a function of the amount of $Y_2O_3$ at five minutes after stoppage of the excitation;

FIG. 7 is a graph showing the emission spectrum of Example 5; and

FIG. 8 is a graph showing relative phosphorescence brightness ratio of a yellowish green long-lasting phosphor $SrO.1.75Al_2O_3.bY_2O_3.0.06B_2O_3.0.004Eu_2O_3$ as a function of the amount of $Y_2O_3$ at five minutes after stoppage of the excitation.

Examples of the invention will be described below. It is to be noted that the invention is not limited to these examples.

EXAMPLES

Example 1

| | |
|---|---|
| $CaCO_3$ | 7.27 g |
| $Al_2O_3$ | 7.41 g |
| $Y_2O_3$ | 0.03 g |
| $H_3BO_3$ | 0.18 g |
| $Eu_2O_3$ | 0.10 g |

The materials of the above composition were mixed sufficiently and sintered in the mixed gas flow of $97N_2+3H_2$ under the temperature of 1300° C. for two hours whereby a long-lasting phosphor having the chemical composition $CaO.Al_2O_3.0.002Y_2O_3.0.02B_2O_3.0.004Eu_2O_3$ was produced. This long-lasting phosphor has an emission characteristic which has an emission peak in the vicinity of 440 nm as shown in FIG. 1. Blue phosphorescence was observed with the naked eye.

FIG. 2 shows relative phosphorescence brightness ratio of the blue color long-lasting phosphor $CaO.Al_2O_3.bY_2O_3.0.02B_2O_3.0.004Eu_2O_3$ depending upon the amount of $Y_2O_3$ at five minutes after stoppage of excitation. The composition of b=0 is Comparative Example (A). The phosphorescence brightness of this example and comparative example was measured by a luminance meter after irradiation of illuminance of 200 lux for 30 minutes with D65 light source (FL20S.D-EDL-D65 made by Toshiba Litec K.K.). The relative phosphorescence brightness ratio represents the ratio of phosphorescence brightness of the example of the present invention to phosphorescence brightness of the comparative example measured upon lapse of the same duration of time.

Figure 3:
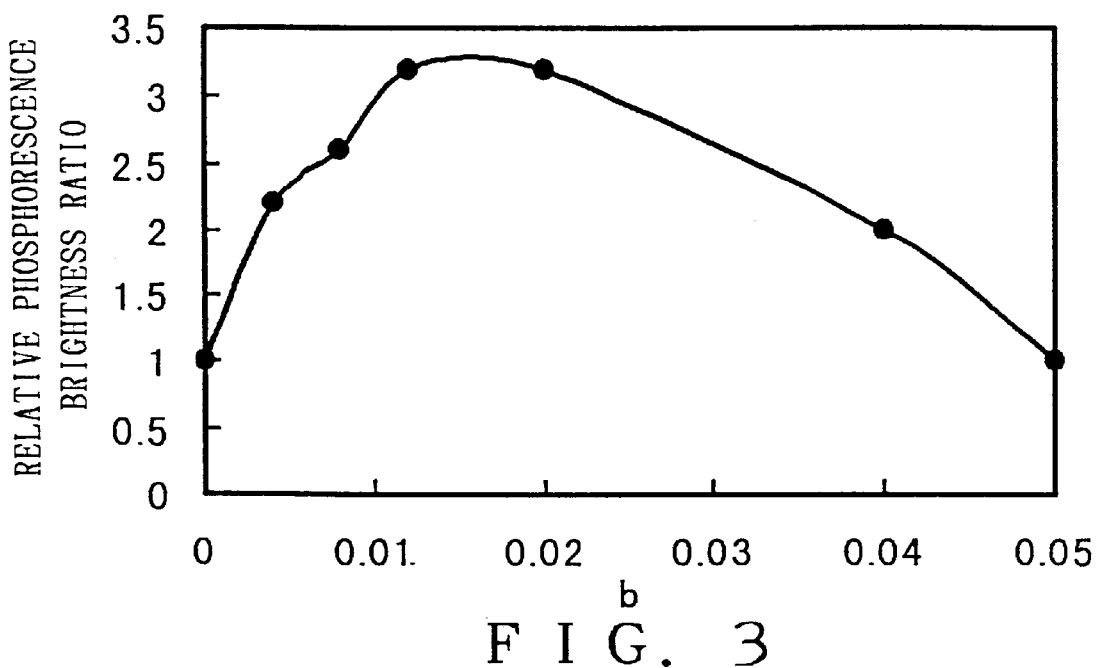
FIG. 3 is a graph showing relative phosphorescence brightness ratio of a blue long-lasting phosphor $CaO.Al_2O_3.bSiO_2.0.02B_2O_3.0.004Eu_2O_3$ as a function of the amount of $SiO_2$ at five minutes after stoppage of the excitation.

FIG. 3 shows relative phosphorescence brightness ratio of a blue $SiO_2$ containing $CaO.Al_2O_3.bSiO_2.0.02B_2O_3.0.004Eu_2O_3$ long-lasting phosphor depending upon the amount of $SiO_2$ at five minutes after stoppage of excitation. The composition of b=0 is Comparative Example (A).

As will be apparent from FIGS. 2 and 3, the long-lasting phosphors of the present invention containing a small amount of $Y_2O_3$ and $SiO_2$ have a significantly higher phosphorescence brightness than the prior art aluminate long-lasting phosphor, i.e., Comparative Example (A).

| | |
|---|---|
| $SrCO_3$ | 8.71 g |
| $Al_2O_3$ | 6.02 g |
| $Y_2O_3$ | 0.03 g |
| $H_3BO_3$ | 0.15 g |
| $Eu_2O_3$ | 0.10 g |

Figure 4:
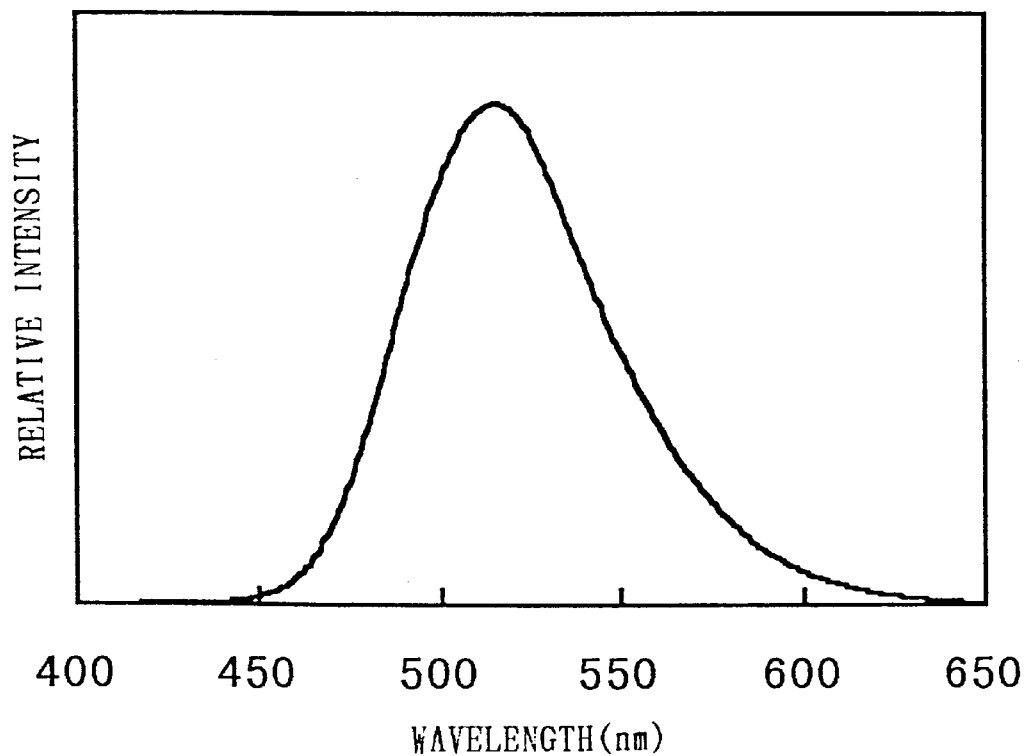
FIG. 4 is a graph showing the emission spectrum of Example 2.

The materials of the above composition were mixed sufficiently and sintered in the mixed gas flow of $97N_2+3H_2$ under the temperature of 1350° C. for two hours whereby a long-lasting phosphor having the chemical composition $SrO.Al_2O_3.0.002Y_2O_3.0.02B_2O_3.0.005Eu_2O_3$ was produced. This long-lasting phosphor has an emission characteristic which has an emission peak in the vicinity of 520 nm as shown in FIG. 4. Yellowish green phosphorescence was observed with the naked eye.

Figure 5:
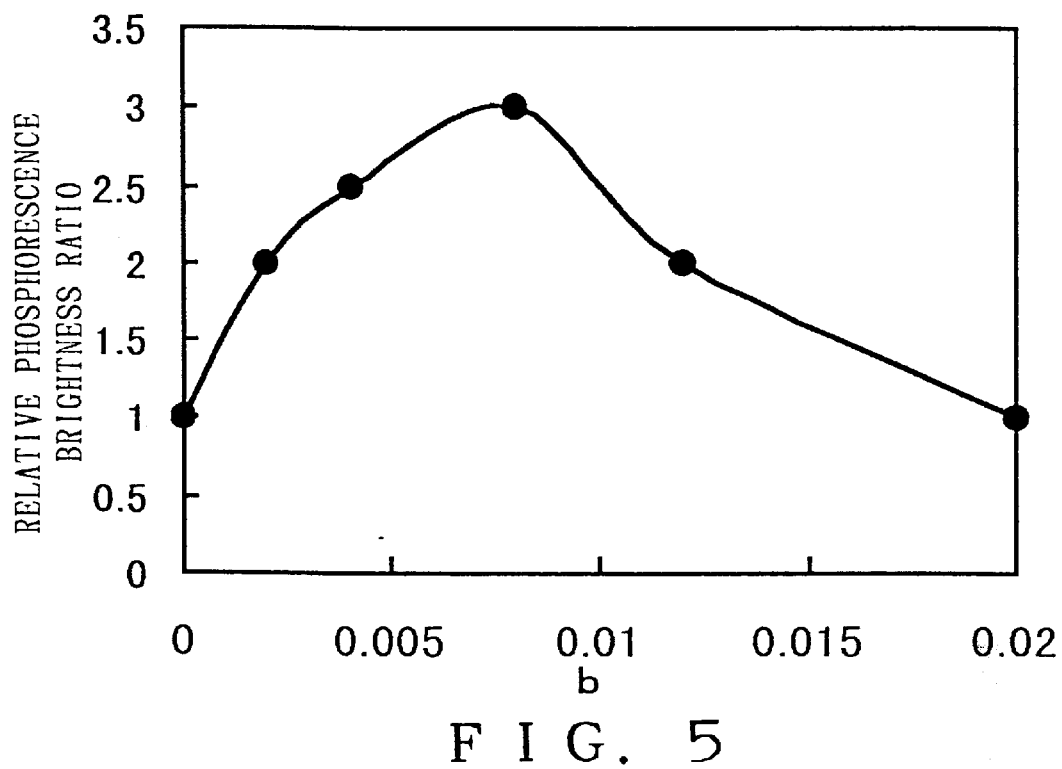
FIG. 5 is a graph showing relative phosphorescence brightness ratio of a yellowish green long-lasting phosphor $SrO.Al_2O_3.bY_2O_3.0.02B_2O_3.0.005Eu_2O_3$ as a function of the amount of $Y_2O_3$ at five minutes after stoppage of the excitation.

FIG. 5 shows relative phosphorescence brightness ratio of the yellowish green $SrO.Al_2O_3.bY_2O_3.0.02B_2O_3.0.005Eu_2O_3$ long-lasting phosphor depending upon the amount of $Y_2O_3$ at five minutes after stoppage of excitation. The composition of b=0 is Comparative Example (B).

From FIG. 5, it is seen that the long-lasting phosphor of the present invention containing a small amount of $Y_2O_3$ has phosphorescence brightness which is about three times as high as Comparative Example (B).

Figure 6:
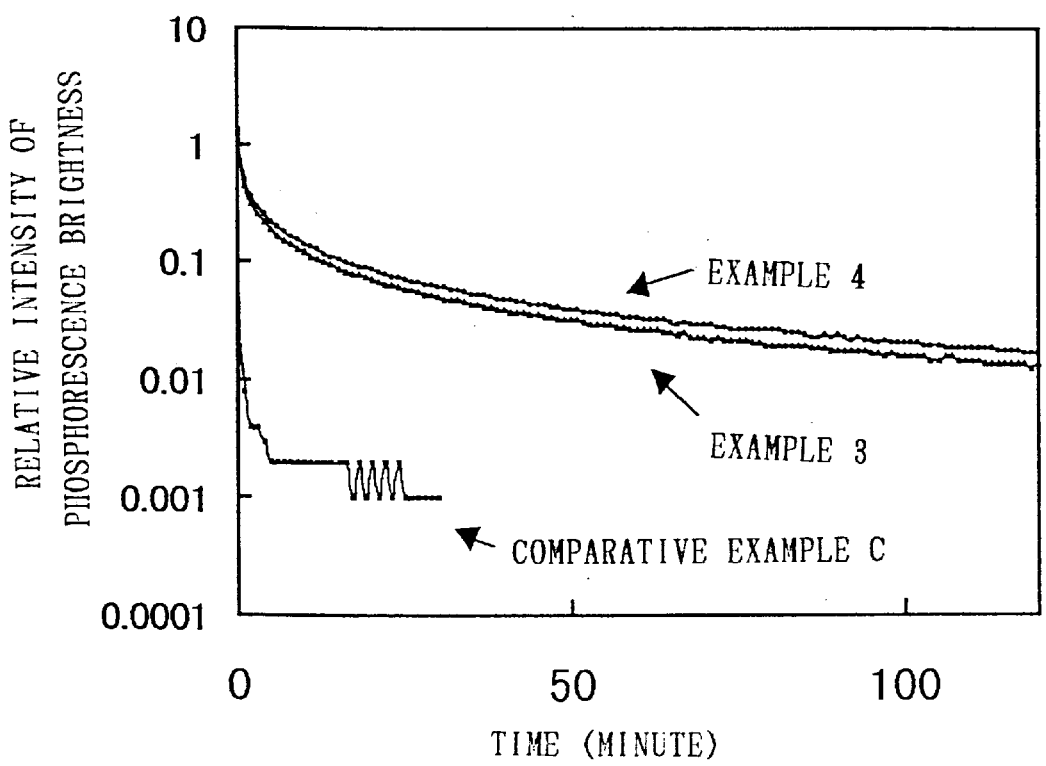
FIG. 6 is a graph showing decay curve of phosphorescence of Examples 3 and 4 and Comparative Example (C) after stoppage of the excitation.

In the same manner as in Example 2, Example 3 (composition: $SrO.Al_2O_3.0.004Sc_2O_3.0.02B_2O_3.0.006Eu_2O_3$) and Example 4 (composition: $SrO.Al_2O_3.0.008Sc_2O_3.0.02B_2O_3.0.006Eu_2O_3$) were produced. The phosphorescence characteristics of Examples 3 and 4 are shown with those of a composition which does not contain $Sc_2O_3$ in FIG. 6. From FIG. 6, it will be seen that phosphorescence brightness and lifetime of the long-lasting phosphors of the present invention containing a small amount of $Sc_2O_3$ are improved by more than ten times as compared with Comparative Example (C) which does not contain $Sc_2O_3$.

| | |
|---|---|
| $SrCO_3$ | 6.60 g |
| $Al_2O_3$ | 7.97 g |
| $Y_2O_3$ | 0.06 g |
| $H_3BO_3$ | 0.31 g |
| $Eu_2O_3$ | 0.07 g |

The materials of the above composition were mixed sufficiently and sintered in the mixed gas flow of $97N_2+3H_2$ under the temperature of 1450° C. for two hours whereby a long-lasting phosphor having the chemical composition $SrO.1.75Al_2O_3.0.006Y_2O_3.0.06B_2O_39$ $0.004Eu_2O_3$ was produced. This long-lasting phosphor has an emission characteristic which has an emission peak in the vicinity of 490 nm as shown in FIG. 7. Bluish green phosphorescence was observed with the naked eye.

FIG. 8 shows relative phosphorescence brightness ratio of the bluish green $SrO.1.75Al_2O_3.bY_2O_3.0.06B_2O_3.0.004Eu_2O_3$ long-lasting phosphor depending upon the amount of $Y_2O_3$ at five minutes after stoppage of excitation. The composition of b=0 is Comparative Example (D).

From FIG. 8, it is seen that the long-lasting phosphor of the present invention containing a small amount of $Y_2O_3$ has phosphorescence brightness which is about 3.5 times as high as Comparative Example (D).

In the same manner as in Example 5, Examples 6–15 having the same emission color were produced. In Examples 6 and 7, $Ga_2O_3$ replaced a part of $Al_2O_3$. In Examples 8, 9 and 10, a part of Sr was substituted respectively by Mg, Ba and Zn. In Example 11, $YF_3$ was used as a starting material instead of $Y_2O_3$. In Examples 12 and 13, $NH_4F$ and $NH_4Cl$ were used as a flux and, in Example 14, $NH_4H_2PO_4$ was used as a flux. Table 1 shows relative phosphorescence ratio of these examples at five minutes after stoppage of excitation. In all of the compositions, remarkable increase in phosphorescence brightness was observed.

TABLE 1

| No. | composition | relative phosphorescence brightness ratio |
|---|---|---|
| 6 | $SrO.1.75(Al_{0.995}Ga_{0.005})_2O_3$ .$0.016Y_2O_3.0.06B_2O_3.0.004Eu_2O_3$ | 2.5 |
| 7 | $SrO.1.75(Al_{0.990}Ga_{0.010})_2O_3$ .$0.016Y_2O_3.0.06B_2O_3.0.004Eu_2O_3$ | 2.0 |
| 8 | $(Sr_{0.99}Mg_{0.01}O).1.75Al_2O_3$ .$0.011Y_2O_3.0.06B_2O_3.0.004Eu_2O_3$ | 1.3 |
| 9 | $(Sr_{0.99}Ba_{0.01}O).1.75Al_2O_3$ .$0.011Y_2O_3.0.06B_2O_3.0.004Eu_2O_3$ | 1.5 |
| 10 | $(Sr_{0.99}Zn_{0.01}O) 1.75Al_2O_3$ .$0.011Y_2O_3.0.06B_2O_3.0.004Eu_2O_3$ | 1.2 |
| 11 | $SrO.1.75Al_2O_3$ .$0.014Y_2O_3.0.06B_2O_3.0.004Eu_2O_3$ | 3.0 |
| 12 | $SrO.1.75Al_2O_3$ .$0.014Y_2O_3.0.06B_2O_3.0.004Eu_2O_3$ + $NH_4F$ | 2.5 |
| 13 | $SrO.1.75Al_2O_3$ .$0.014Y_2O_3.0.06B_2O_3.0.004Eu_2O_3$ + $NH_4Cl$ | 2.2 |
| 14 | $SrO.1.75Al_2O_3$ .$0.010Y_2O_3.0.06B_2O_3.0.004Eu_2O_3$ + $NH_4H_2PO_4$ | 1.5 |
| 15 | $BaO.Al_2O_3$ $0.008Y_2O_3.0.06B_2O_3.0.004Eu_2O_3$ | 2.8 |
| Comparative Example (D) | $SrO.1.75Al_2O_3$ .$0.06B_2O_3.0.004Eu_2O_3$ | 1 |

Light Resistance Test

Since long-lasting phosphors are often used in a state in which they are exposed directly to the sunlight, they must have sufficient resistance to the sunlight, particularly ultraviolet ray contained therein. A light resistance test was conducted on the long-lasting phosphors obtained by the present invention in accordance with JIS-K5671 (Method of light resistance test for light-emitting coating materials). As a result, no deterioration in phosphorescence brightness was observed in any of the examples.

What is claimed is:

1. A long-lasting phosphor being activated by divalent europium and having a chemical composition $RO.a(Al_{1-x}Ga_x)_2O_3.bM_mO_n.cB_2O_3.dEu^{2+}$ where R is at least one member selected from the group consisting of alkaline-earth metals and Zn, and M is at least one member selected from the group consisting of Y, Sc and Si wherein a, b, c, d and x are within the ranges of $0.3 \leq a \leq 8$, $0 < b \leq 0.2$, $0.001 \leq c \leq 0.3$, $0.001 \leq d \leq 0.3$, and $0 \leq x < 1.0$, wherein m is 2 and n is 3 if M is Y or Sc, and m is 1 and n is 2 if M is Si.

2. A long-lasting phosphor as defined in claim 1 wherein M is Y.

3. A long-lasting phosphor as defined in claim 1 wherein M is Sc.

4. A long-lasting phosphor as defined in claim 1 wherein M is Si.

* * * * *